United States Patent
DeAngelo et al.

(10) Patent No.: US 8,913,006 B2
(45) Date of Patent: Dec. 16, 2014

(54) RECIPROCAL INTERFACE PANELS SUITABLE FOR MULTI-PURPOSE ACTUATORS

(75) Inventors: Paul Joseph DeAngelo, Bridgewater, MA (US); Coleman McCourt Flanagan, Marlborough, MA (US)

(73) Assignee: Olympus NDT, Inc., Waltham, MA (US)

( * ) Notice: Subject to any disclaimer, the term of this patent is extended or adjusted under 35 U.S.C. 154(b) by 259 days.

(21) Appl. No.: 13/363,550

(22) Filed: Feb. 1, 2012

(65) Prior Publication Data

US 2012/0200504 A1  Aug. 9, 2012

Related U.S. Application Data

(60) Provisional application No. 61/439,154, filed on Feb. 3, 2011.

(51) Int. Cl.
G09G 5/00 (2006.01)
G06F 3/02 (2006.01)
G06F 9/445 (2006.01)
G06F 9/44 (2006.01)

(52) U.S. Cl.
CPC .............. *G06F 3/0227* (2013.01); *G06F 9/445* (2013.01); *G06F 9/4443* (2013.01)
USPC ............................................ 345/156; 73/584

(58) Field of Classification Search
None
See application file for complete search history.

(56) References Cited

U.S. PATENT DOCUMENTS

2008/0100572 A1* 5/2008 Boillot .......................... 345/158

* cited by examiner

*Primary Examiner* — Adam R Giesy
(74) *Attorney, Agent, or Firm* — Ostrolenk Faber LLP

(57) ABSTRACT

A non-destructive inspection and testing instrument includes a housing and a first panel with a first type input to be assembled onto the housing and a second panel with a different, second type input to be assembled onto the housing. A first GUI module for the first panel implements a function upon an actuation of the first type input. A second GUI module for the second panel implements the same function upon an actuation of the second type input. A controller is configured to select the first GUI module when the first panel is associated with the instrument and to select the second GUI module when the second panel is associated with the instrument.

17 Claims, 5 Drawing Sheets

RECIPROCAL INTERFACE PANELS SUITABLE FOR MULTI-PURPOSE ACTUATORS

CROSS-REFERENCE TO RELATED APPLICATIONS

This application claims benefit of and priority to U.S. Provisional Application Ser. No. 61/439,154 filed Feb. 3, 2011 under 35 U.S.C. §§119, 120, 363, 365, and 37 C.F.R. §1.55 and §1.78 incorporated herein by this reference.

FIELD OF THE INVENTION

The subject invention relates to instruments such as non-destructive test instrumentation (e.g., ultrasonic flaw detector instruments).

BACKGROUND OF THE INVENTION

Ultrasonic detection and measurement systems can be utilized to detect internal structural flaws within an object or material by transmitting ultrasonic pulses to a target object and analyzing echo signals detected from the target object. Known ultrasonic detectors include the instant assignee's Epoch 4 Plus product. Products are also available from General Electric, such as the USM 35X, USN 58L, and USN 60 fault detection systems. A typical ultrasonic detector includes a transducer which is placed against the object to be tested and which works in conjunction with circuits such as gain amplifiers, preamplifiers, attenuators, and the like housed in a case with a user interface.

Some ultrasonic instruments include user interfaces with a rotating dial used, for example, to set the gain. Other models have a user interface with arrow buttons used for setting the gain. Over time, users have become accustomed to one or the other type of user interface. But manufacturers typically produce, for a given model, only one type of user interface.

SUMMARY OF THE INVENTION

Manufacturing two different versions of the same model instrument is problematic in that different parts lists are required adding to the cost of the unit and the complexity of its assembly. If the rotary dial version user interface, for example, is included in a unit programmed with a driver for an arrow button type user interface, the result is a defective unit which will not operate properly.

Thus, there is need for an instrument that can be offered with different user interfaces depending on the user's preference but which does not greatly increase the cost of the product or the complexity of its assembly. An object of the present invention is to manufacture an instrument with different user interfaces while lowering the chance of defects.

The invention results, at least in part, from the realization that, in one preferred embodiment, a new instrument such as an ultrasonic flaw detector can be configured to automatically identify the type of user interface installed during assembly and, upon startup, to then select the correct driver for that interface. Another aspect of the invention includes a feature wherein different actuatable inputs implement the same overall functionality.

The subject invention, however, in other embodiments, need not achieve all these objectives and the claims hereof should not be limited to structures or methods capable of achieving these objectives.

Featured is a non-destructive inspection and testing instrument comprising a user interface including a housing, and a first panel with a first type input to be assembled onto the housing, or a second panel with a different, second type input to be assembled onto the housing. A first GUI module for the first panel implements a function upon an actuation of the first type input. A second GUI module for the second panel implements the same function upon an actuation of the second type input. A controller is configured to select the first GUI module when the first panel is associated with the instrument and to select the second GUI module when the second panel is associated with the instrument. Typically the controller is configured to automatically determine which panel is installed with the instrument.

In one example, the first panel includes a first circuit, the second panel includes a second circuit, and the controller is configured to query the panel installed on the instrument and identify the panel by its circuit. The first circuit may include one or more electrical contacts connected to ground and the second circuit may include one or more electrical contacts connected to a voltage. In one version, the first type input includes a knob and the second type input includes navigation arrow buttons. Typically, the user interface includes a keypad assembly on a front enclosure plate of the instrument. In one example, the front enclosure plate includes an orifice for a knob associated with one panel and there is a plug in the orifice in the front enclosure plate when the other panel is installed on the front enclosure plate of the instrument.

This invention also features a method comprising loading an instrument with a first GUI module for a first user interface type, loading the instrument with a second GUI module for a second user interface type, and installing a user interface. A first panel with the first user interface type has at least a first actuatable input and a second panel with the second user interface type has at least a second actuatable input. Which panel is installed is automatically determined and the first GUI module is selected if the first panel is installed on the instrument and the second GUI module is selected if the second panel is installed on the instrument. A function is implemented if the first actuatable input is present and actuated, and the same function is implemented if the second actuatable input in present and activated.

In one example, a first circuit is added to the first panel, a second circuit is added to the second panel, and the panel installed on the instrument is queried and identified by its circuit. In some embodiments, the first circuit includes at least one panel pin connected to ground and the second circuit includes at least one panel pin connected to a voltage.

In some example, an orifice for a knob is formed in the front enclosure plate. One method further includes installing a plug in the orifice in the front enclosure plate when the second user interface type is installed.

Other features and advantages of the present invention will become apparent from the following description of the invention which refers to the accompanying drawings.

DETAILED DESCRIPTION OF EMBODIMENTS OF THE INVENTION

Figure 1:
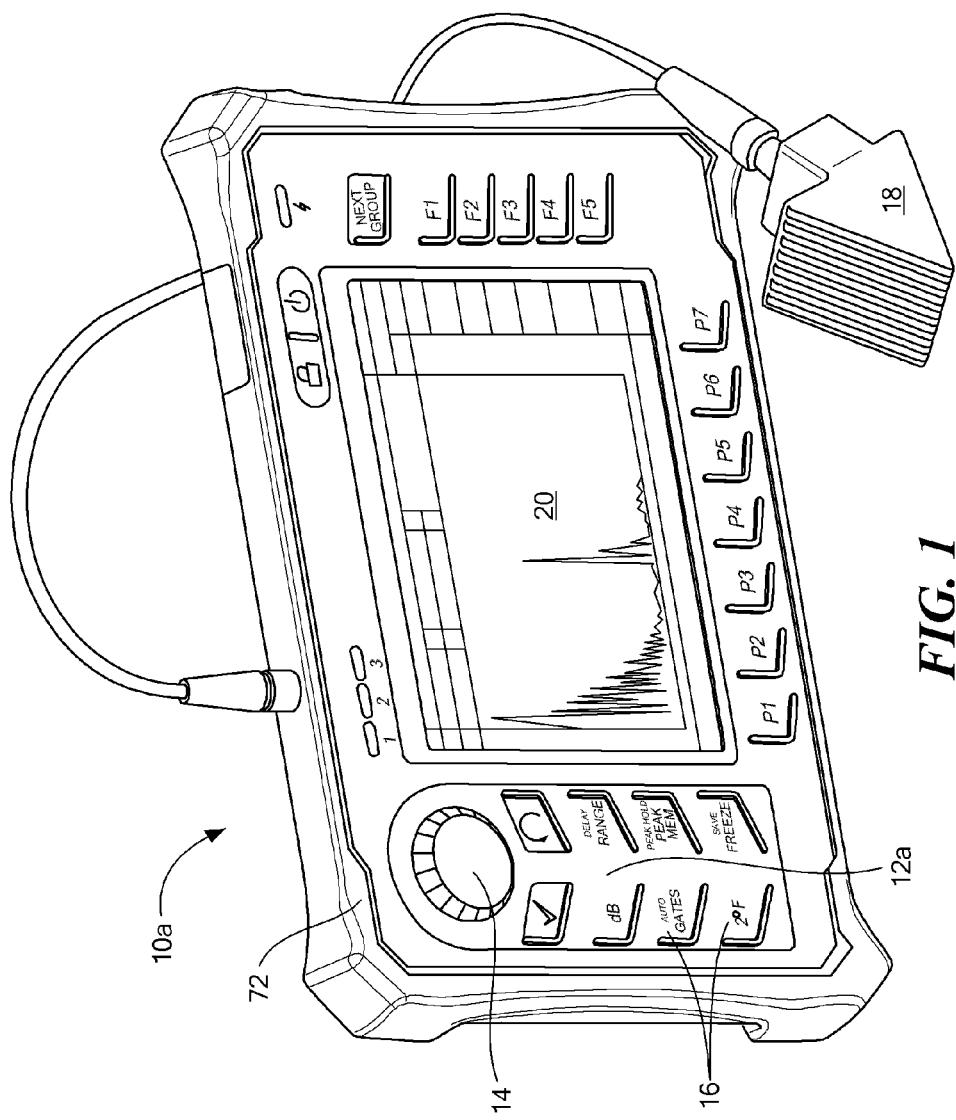
FIG. 1 is a schematic three dimensional front view showing an example of a ultrasonic flaw detection instrument including a first type of user input in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 depicts an example of an instrument wherein ultrasonic flaw detection system 10a includes an input selector configuration 12a with rotary switch (knob) 14 as well as direct access keys 16. Actuatable input knob 14 is the primary adjustment device used along with keys such as a check key and an escape key to adjust parameter values in either coarse or fine increments. The knob can be locked to prevent accidental parameter value changes during an inspection. System 10a also includes probe 18, screen 20, as well as other subsystems. See, for example, U.S. Pat. No. 7,832,275 incorporated herein by this reference. The housing for the instrument typically includes front enclosure plate 72.

Figure 2:
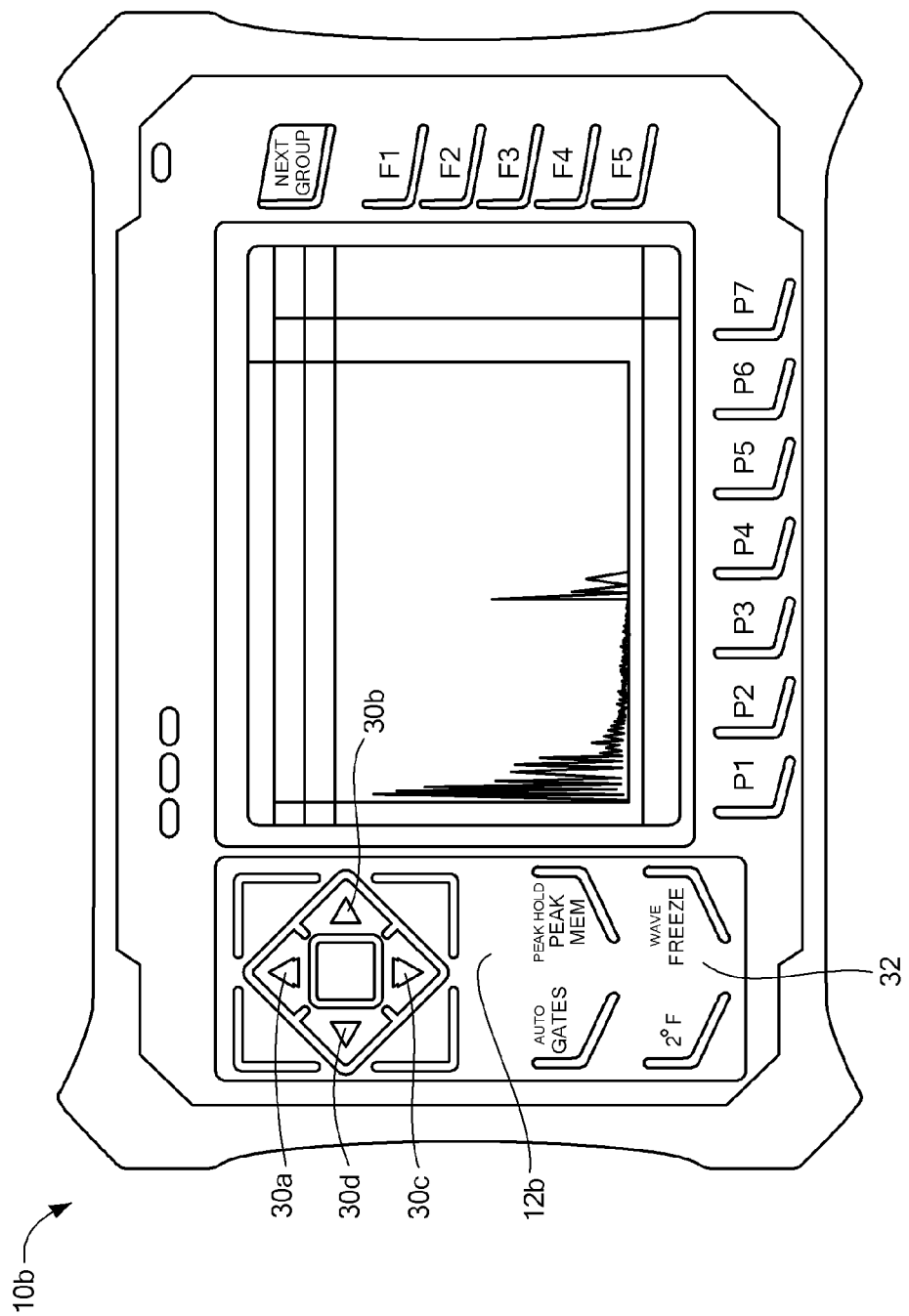
FIG. 2 is a schematic three dimensional front view showing the same instrument as shown in FIG. 1 but with a different type of user interface.

As shown in FIG. 2, the same model of this instrument 10b may instead include input selector configuration 12b now with actuatable arrow buttons 30a, 30b, 30c and 30d typically used as inputs for course parameter adjustment (e.g., the up and down arrows) and fine adjustment (e.g., the left and right arrows). Direct access keys 32 are also included.

Preferably, whether a knob configuration or an arrow key configuration is included as a part of the instrument, they invoke the same general functionality. That is, turning the knob, FIG. 1, to the right can be used to increase the gain while pressing the right (or up) arrow key, FIG. 2, also increases the gain. Turning the knob to the left decreases the gain while pressing the left arrow button (or down arrow button) similarly decreases the gain. Other parameters are similarly adjusted, selected, and the like depending on the instrument and its user interface. The input selectors are used to adjust a variety of parameters, to change menu choices, to make menu selections, and the like.

Figure 3:
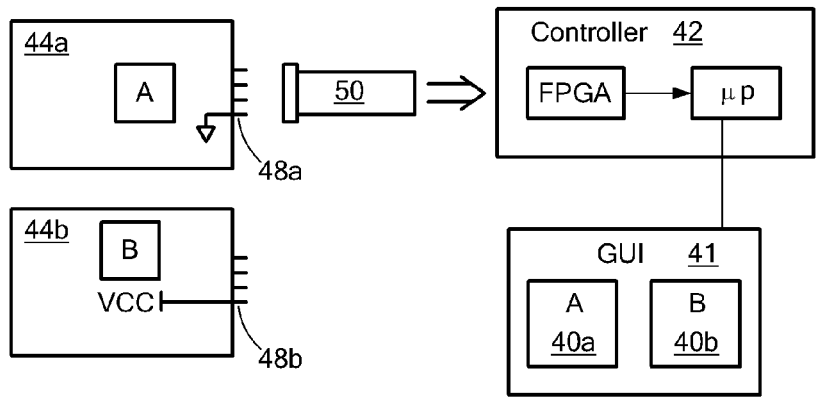
FIG. 3 is a block diagram depicting several of the primary components associated with the instrument of FIGS. 1-2.

For the two input selection configurations or input types discussed above, different software drivers, GUI modules, or code sections may be required in order to interpret and process signals output by the selection buttons, knobs, and the like (typically according to different protocols). FIG. 3 shows an example of how modules 40a and 40b both reside in the same instrument and instruct or operate on controller 42 (a microprocessor, FPGA, or the like) to execute various functions. A user interface panel (e.g., keypad or panel 44a) includes one input selector configuration, discussed above, for example the knob configuration. During assembly, panel 44a is plugged into flex cable 50 which ultimately transmits signals to controller 42. Intervening signal processing circuitry is not depicted. In this specific design, there is also a pin 48a connected via a circuit to ground. Controller 42 polls or reads or senses panel 44a and detects the ground of pin 48a. In response, controller 42 selects module 40a (e.g., a graphical user interface for a user interface with a knob and other keys as depicted in FIG. 1) which then operates as programmed to process selections made via the knob and other keys.

Conversely, for a different customer or user, interface panel 44b (e.g., a keypad assembly plate) is installed and includes a different input selection configuration, for example, the arrow key configuration discussed above with respect to FIG. 2. In this example, input pin 48b is connected to a voltage via a circuit as shown and when panel 44b is plugged into cable 50 during assembly, controller 42, upon startup, for example, polls pin 48b and detects voltage Vcc. In response, controller 42 is programmed to select graphical user interface 40b (for example, a GUI specific to the navigation pad configuration shown in FIG. 2). This driver then processes selections made via the arrow keys and the like.

In one specific design, the controller includes an FPGA programmed, upon start up, to poll, sense, or query the type of panel installed. This information is then provided to a microprocessor which processes events from a GUI responsive to activation of the various inputs of the installed panel to control the instrument, its hardware, and software.

In but one example, when panel A is installed, as detected by the FPGA, those portions or lines of GUI code specific to panel B are rendered dormant. Conversely, when panel B is installed, those lines of code associated with panel A are rendered dormant. Thus, there may be two or more GUIs or one master GUI 41, FIG. 3, with lines of code or modules implementing the functionality of multiple GUIs. It can be appreciated that modules 40a and 40b are used associated with sense panel 44a and 44b, respectively; master GUI or module 41 is used for all common inspection functions common to the instrument in configurations of either 10a and 10b. And, by controller, we mean the FPGA and microprocessor combination discussed above, single microcontrollers, corresponding processor(s), and equivalents thereto.

Figure 4:
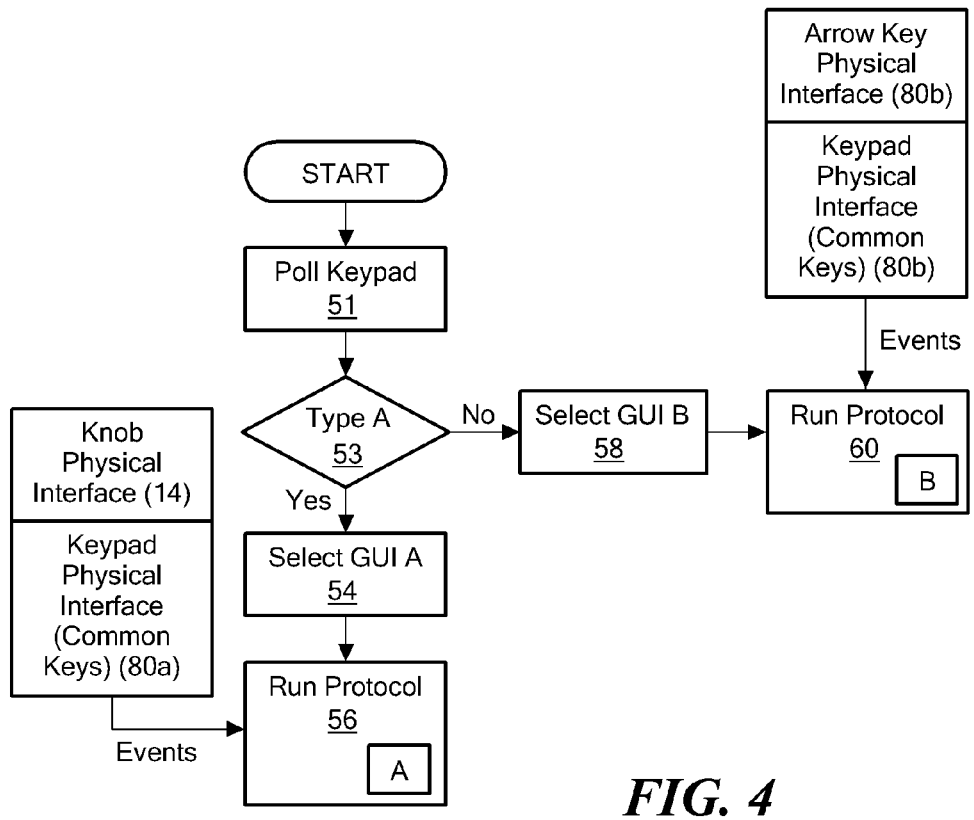
FIG. 4 is a flow chart depicting the primary steps associated with the programming of the controller depicted in FIG. 3.

Thus, in this example, controller 42, at startup, polls the keypad assembled with the instrument, step 51, FIG. 4. If it is a "type A" keypad as shown at step 53, then graphical user interface code A is selected as shown at step 54 and its protocols are run, step 56. If instead at step 53 the type A keypad is not detected then, in this specific example, graphical user interface code B is selected as shown in step 58 and its protocols are run as shown in step 60. But, there are other ways of selecting the appropriate driver including the use of settings and/or switches and the like. Also an appropriately programmed controller polling a circuit is only one example of such means for selecting. Preferably, the graphical user interface modules have similar functionality for the knob and arrow keys as discussed above; that is, in but one example, turning the knob to the right increases the parameter selected while pressing the right (or up) arrow key also increases the parameter.

Thus, in this example, the knob physical interface 14 right turn events will cause an electric contacting event translated via GUI 40a, or in some cases GUI 41, and further interpreted by the selected protocol A 56 in controller 42 to increase the parameter selected. Similarly pressing arrow keypad 30a or 30b or the like causes physical interface 80b (shown in FIG. 6) a specific electric contacting event (right or up) which is further interpreted by the selected protocol B 60 in controller 42 to increase the parameter selected. It should be also noted that common key events are initiated via keypad physical interfaces 80*a* or 80*b* (shown in FIGS. 5 and 6) interfaced via master module or GUI 41 to achieve the identical functions common to instrument in configurations 10*a* and 10*b*, respectively.

Figure 5:
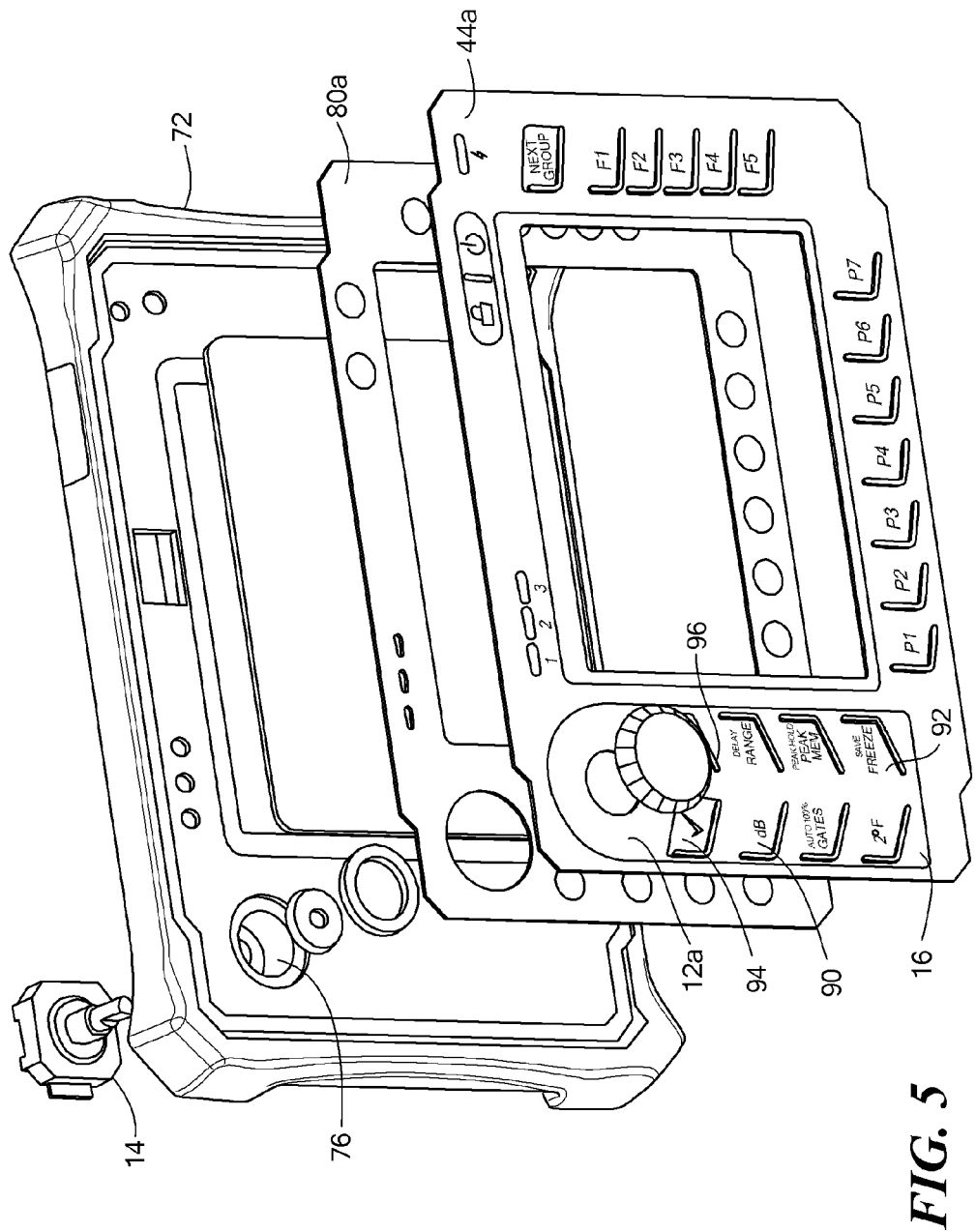
FIG. 5 is an exploded three dimensional front view showing a keypad assembly to be installed on the front enclosure plate for the instrument depicted in FIG. 1.
Figure 6:
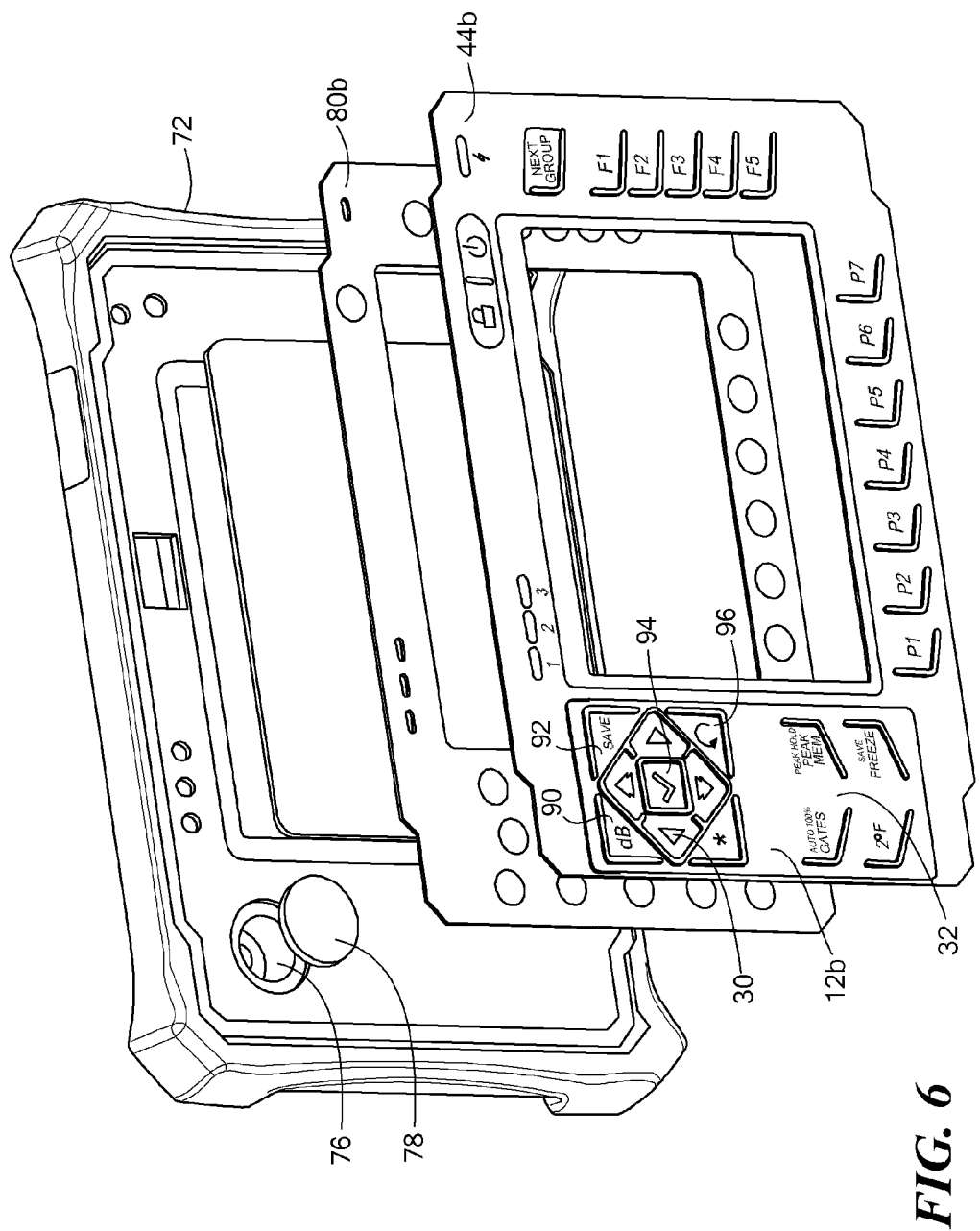
FIG. 6 is a schematic exploded view showing a keypad assembly to be installed on the front enclosure plate of the instrument depicted in FIG. 2.

The user interface shown in FIG. 5 typically includes keypad assembly 44*a* and knob keypad physical interface 80*a* on front enclosure plate 72 of the instrument while the user interface of FIG. 6 typically includes keypad assembly 44*b* and keypad physical interface 80*b* on front enclosure plate 72. Front enclosure plate 72 includes orifice 76 for knob assembly 14. Plug 78, FIG. 6 is provided when keypad assembly 44*b* is installed on front enclosure plate 72.

The navigation pads also contain additional functions and frequently used parameters such as gain 90 save 92, CHECK 94, and ESCAPE 96 keys. The front panels shown feature a combination of direct-access keys, navigation arrows, and dynamic function and parameter access keys to optimize the usability of the instrument in any mode. The layout of the front panel provides direct access to common inspection parameters, and easy adjustment of values from either side of the instrument without obstructing the view of the display.

The gain key adjusts system sensitivity, the save key saves a selected file, the freeze button holds a displayed waveform, the gate button is used to select gates, the range key displays the delay that does not affect the calibrated zero offset, the peak key activates a peak memory function and the 2*d* F activates a second function for these keys. The direct access keypad, on the left side of the front panel, provides keys for direct access to software parameters that are commonly used during inspection.

The invention provides navigation arrows or an adjustment knob (depending on the configuration), but also inputs like the CHECK and ESCAPE keys, which are general purpose keys, regardless of instrument mode or function.

The CHECK key has two primary functions, when an adjustment parameter is highlighted, CHECK toggles the parameter adjustment between a coarse and a fine adjustment (knob configuration). Coarse adjustment is indicated by brackets around the parameter key. Fine adjustment does not have brackets. The CHECK key is used to scroll through the menus in numerical order (navigation pad configuration). The ESCAPE key has three primary functions, when in a setup page ESCAPE returns to the liver inspection screen. Whichever the selected menu, the ESCAPE key returns to the Basic menu. When a direct access parameter (gain, range, gates, etc.) is selected, pressing the ESCAPE key will return to the previous menu.

Adjustments and/or the activation of most software functions are handled using an intuitive menu system. Menu system software buttons appear at all times, vertically on the right side and horizontally at the bottom of the display. Five function keys (F1 through F5) and seven parameter keys (P1 through P7) are located around the display, allowing a user to individually activate a software button.

Software parameter value adjustments, such as gain or range, can be accomplished using two primary methods, depending on the instrument configuration. The UP, DOWN, LEFT, and RIGHT arrow keys can be used to increase and decrease a parameter value in either coarse or fine steps (navigation pad configuration). The adjustment knob can be turned clockwise to increase parameter values, and counterclockwise to decrease a parameter value in either coarse or fine steps (knob configuration).

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. For example, the invention can be implemented in instruments other than ultrasonic flaw detectors and with user interfaces other than those including knobs and/or arrow keys.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed:

1. A non-destructive inspection and testing instrument comprising:
   a user interface including:
      a housing,
      a first panel with a first type input to be assembled onto the housing, or
      a second panel with a different, second type input to be assembled onto the housing,
   wherein the first panel includes a first circuit, and the second panel includes a second circuit,
      a first GUI module for the first panel implementing a function upon an actuation of the first type input;
      a second GUI module for the second panel implementing the same function upon an actuation of the second type input; and
      a controller configured to query one of the first or the second panels which is installed on the instrument and identify the panel by either the first or the second circuit and the controller is further configured to select the first GUI module when the first panel is associated with the instrument and to select the second GUI module when the second panel is associated with the instrument,
   wherein the first panel includes a first keypad physical interface assembly transmitting a first mechanical move on the first panel to a first corresponding electronic contacting event and the second panel includes a second keypad physical interface assembly transmitting a second mechanical move on the second panel to a second corresponding electronic contacting event.

2. The instrument of claim 1 in which the controller is configured to automatically determine which panel is installed with the instrument.

3. The instrument of claim 1 in which the first circuit includes one or more electrical contacts connected to ground and the second circuit includes one or more electrical contacts connected to a voltage.

4. The instrument of claim 1 in which the first type input includes a knob.

5. The instrument of claim 1 in which the second type input includes navigation arrow buttons.

6. The instrument of claim 1 in which the first keypad assembly is on a front enclosure plate of the instrument.

7. The instrument of claim 6 in which the front enclosure plate includes an orifice for a knob associated with the first keypad assembly.

8. The instrument of claim 1 further including a plug in an orifice in a front enclosure plate when the second keypad assembly is installed on the front enclosure plate of the instrument.

9. The instrument of claim 6 in which the first and second keypad assemblies further include common inputs.

10. A method comprising:
loading an instrument with a first GUI module for a first user interface type;
loading the instrument with a second GUI module for a second user interface type;
installing a user interface including:
a first panel with the first user interface type having at least a first actuatable input, wherein the first panel including a first circuit; or
a second panel with the second user interface type having at least a second actuatable input, wherein the second panel including a second circuit; and
querying the panel installed on the instrument and identifying the panel by determining if the first circuit or the second circuit is connected,
automatically determining which panel is installed,
selecting the first GUI module if the first panel is installed on the instrument,
selecting the second GUI module if the second panel is installed on the instrument,
implementing a function if the first actuatable input is present and activated,
implementing the same function if the second actuatable input is present and activated, and
forming an orifice for a knob in a front enclosure plate and in a first keypad assembly.

11. The method of claim 10 in which the first circuit includes at least one panel pin connected to ground and the second circuit includes at least one panel pin connected to a voltage.

12. The method of claim 10 in which the first panel actuatable input includes a knob.

13. The method of claim 10 in which the second panel actuatable input includes navigation arrow keys.

14. The method of claim 10 in which installing includes fitting the first keypad assembly on a front enclosure plate of the instrument.

15. The method of claim 14 in which the first panel includes the first keypad assembly and the second panel includes a second keypad assembly.

16. The method of claim 15 further including installing a plug in the orifice in the front enclosure plate when the second keypad assembly is installed.

17. The method of claim 15 further including providing common inputs on both keypad assemblies.

* * * * *